United States Patent [19]

D'Amico

[11] 3,726,866

[45] Apr. 10, 1973

[54] 2-BENZIMIDAZALYLDITHIO CARBAMATES

[75] Inventor: John Joseph D'Amico, Akron, Ohio

[73] Assignee: Monsanto Company, St. Louis, Mo.

[22] Filed: Nov. 2, 1970

[21] Appl. No.: 86,348

Related U.S. Application Data

[62] Division of Ser. No. 638,595, May 15, 1967, Pat. No. 3,565,894.

[52] U.S. Cl.....260/247.1, 260/256.5 R, 260/293.57, 260/309, 260/309.2, 260/309.6, 260/784
[51] Int. Cl. ..............................................C07d 87/46
[58] Field of Search.......................260/309.2, 247.1, 260/293.57

[56] References Cited

UNITED STATES PATENTS 3,361,752   1/1968   D'Amico..........................260/309.2

OTHER PUBLICATIONS

John J. D'Amico Chemical Abstracts, Vol. 67, page 5082 (1967)

*Primary Examiner*—Alex Mazel
*Assistant Examiner*—Jose Tovar
*Attorney*—Richard O. Zerbe and F. M. Murdock

[57]   ABSTRACT

Heterocyclic esters of dithiocarbamic acid wherein the heterocycle is 2-imidazolyl, 2-imidazolinyl, 2-benzimidazolyl, or substituted derivatives thereof which esters are useful for accelerating the vulcanization of rubber.

9 Claims, No Drawings

2-BENZIMIDAZALYLDITHIO CARBAMATES

This application is a division of application Ser. No. 638,595, filed May 15, 1967 now U.S. Pat. No. 3,565,894, February 23, 1971.

The present invention relates to a new class of products, namely, meta dinitrogen heterocycle esters of dithiocarbamic acids, and to their use for accelerating the vulcanization of rubber.

Salts of dithiocarbamic acids have achieved wide acceptance for accelerating vulcanization of sulfur-vulcanizable rubbers, but esters have been heretofore much less effective. The meta dinitrogen heterocycle esters, however, are potent accelerators.

The new compounds may be represented by the formula

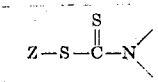

where Z is a heterocycle, the ring members of which consist of three or four carbon atoms and two meta nitrogen atoms, which heterocycle is attached to sulfur at the carbon between the nitrogen atom. One of the bonds between said intermediate carbon atom and the two nitrogen atoms is unsaturated. Substituents may be present on one or more of the other carbon atoms. More particularly, Z is unsubstituted 2-pyrimidinyl, 2-pyrimidinyl containing one or more substituents, unsubstituted dihydro-2-pyrimidinyl, dihydro-2-pyrimidinyl containing one or more substituents, unsubstituted tetrahydro-2-pyrimidinyl, tetrahydro-2-pyrimidinyl containing one or more substituents, unsubstituted 2-imidazolyl, 2-imidazolyl containing one or more substituents, unsubstituted 2-imidazolinyl, or 2-imidazolinyl containing one or more substituents. The substituents may comprise lower alkyl, aralkyl; e.g., benzyl, alicyclic, or aryl. The

group is the residue of a thiocarbamyl radical.

The new compounds can be prepared by the alkaline condensation of a thiocarbamyl halide with ZSH, where Z is a heterocycle as defined. The following are typical examples of suitable mercaptans:

2-mercaptoimidazole
2-mercapto-4,5-dimethylimidazole
2-mercaptoimidazoline
5,5-dimethyl-2-mercapto-3-phenyl-1-imidazoline
2-mercapto-1-phenyl-2-imidazoline
2-mercapto-benzimidazole
4-methyl-2-mercaptoimidazoline
2-mercapto-3,4,5,6-tetrahydropyrimidine
2-mercapto-5-methyl-3,4,5,6-tetrahydropyrimidine
2-mercapto-3-isopropyl-4,6,6-trimethyl-dihydropyrimidine
2-mercapto-3-cyclohexyl-4,6,6-trimethyl-dihydropyrimidine
2-mercapto-3-alphanaphthyl-4,6,6-trimethyl-dihydropyrimidine
2-mercapto-3-phenyl-4,6,6-trimethyl-dihydropyrimidine
2-mercapto-3-o-tolyl-4,6,6-trimethyl-dihydropyrimidine
2-mercapto-4,6,6-trimethyl-dihydropyrimidine
2-mercapto-4,4,6-trimethyl-dihydropyrimidine
2-mercapto-4-ethyl-3,4,5,6-tetrahydropyrimidine
2-mercapto-4,4-diethyl-3,4,5,6-tetrahydropyrimidine
2-mercapto-5-methyl-3,4,5,6-tetrahydropyrimidine
2-mercapto-5,5-dibutyl-3,4,5,6-tetrahydropyrimidine
2-mercapto-4-alphanaphthyl-3,4,5,6-tetrahydropyrimidine
2-mercapto-3,4,5,6-tetrahydropyrimidine
2-mercaptopyrimidine.

In the case of pyrimidinyl mercaptans, 2-mercapto-4,6-dimethylpyrimidine is readily obtained from existing raw materials and yields especially effective accelerators. The hydrochloride of 2-mercapto-4,6-dimethylpyrimidine is a commercially available intermediate which will be hereinafter designated "-hydrochloride intermediate." The 4,6-dimethyl-mercaptopyrimidine base is conveniently formed in situ by addition of alkali and condensed with the desired thiocarbamyl halide. The chlorides are usually satisfactory, but bromides and iodides can be used. The amino substituent of the thiocarbamyl halide is preferably secondary amino. In

$x$ and $y$ independently can be lower alkyl, for example methyl, ethyl, propyl, butyl, or amyl; lower alkenyl, for example allyl or methallyl; lower alkenyl substituted by halogen, for example 2-chloroallyl or 2-bromoallyl; alicyclic, for example cyclopentyl or cyclohexyl; aralkyl, for example benzyl or phenethyl; aryl, for example phenyl, tolyl, or naphthyl; or taken together with the nitrogen form a heterocycle of four to eight carbon atoms, for example pyrrolidinyl, piperidino, 2-methyl-5-ethylpiperidino, hexamethylenimino, morpholino, 2,6-dimethylmorpholino, 2,5-dimethylpyrrolidinyl, heptamethylenimino, and octamethylenimino.

The following examples illustrate the preparation of the new compounds but are not to be taken as limitative.

The example following illustrates the preparation of a meta dinitrogen heterocycle ester in which the heterocycle contains three carbon atoms in the ring and one phenyl substituent outside the ring.

EXAMPLE 1

The 5,5-dimethyl-2-mercapto-3-phenyl-1-imidazoline required for this example was obtained by adding 60.8 grams (0.6 mole) of carbon bisulfide in one portion to a stirred solution of 49.3 grams (0.3 mole) of N-(2-amino-2-methyl)propyl aniline, 150 ml. of ethyl alcohol, and two drops of piperidine. The mixture was heated at refluxing temperature (47°–68°C.) for 24 hours, cooled to 0°C., and then stirred at 0°–10°C. for an hour. After filtering, the product was air-dried at 25°–30°C. giving a white solid, M.P. 171°–172 °C. in 86.5 percent yield. Upon recrystallization from alcohol, the M.P. was unchanged. The product analyzed 13.43 percent nitrogen and 15.57 percent sulfur compared to 13.58 percent nitrogen and 15.54 percent sulfur calculated for $C_{11}H_{14}N_2S$. Although the product is named on the basis of the mercaptan form, it is probably in the tautomeric thione form. However, reaction in alkaline medium apparently involves the sulfur.

To a stirred solution comprising 20.7 grams (0.1 mole) of the 5,5-dimethyl-2-mercapto-3-phenyl-1-imidazoline so prepared, 6.6 grams (0.1 mole) of 85 percent potassium hydroxide, 300 ml. of acetone, and 20 ml. of water was added in one portion 15.2 grams (0.1 mole) of diethylthiocarbamyl chloride. The mixture was stirred for 18 hours at 25°–30°C. whereupon there was added 500 ml. of ethyl ether and 500 ml. of water. After stirring for 15 minutes, the separated ether solution was washed with water until neutral and dried over sodium sulfate. The ether was removed in vacuo at a maximum temperature of 80°–90°C./1–2 mm. 5,5-Dimethyl-3-phenyl-2-imidazolinyl diethyldithiocarbamate was obtained as a viscous amber liquid in 81.5 percent yield. Analysis gave 12.16 percent nitrogen and 19.17 percent sulfur compared to 13.07 percent nitrogen and 19.95 percent sulfur calculated for $C_{16}H_{23}N_3S_2$.

The product of Example 1 was employed as the accelerator in a composition comprising:

| | Parts by Weight |
|---|---|
| Smoked sheets rubber | 100 |
| Carbon black | 50 |
| Zinc oxide | 5 |
| Stearic acid | 3 |
| Saturated hydrocarbon softener | 3 |
| Antioxidant | 2 |
| Sulfur | 2 |
| 5,5-Dimethyl-3-phenyl-2-imidazolinyl diethyldithiocarbamate | 0.5 |

Vulcanization was completed in 30 minutes at a temperature of 144°C. The following results were obtained:

| | |
|---|---|
| Modulus | 2050 lbs./in² |
| Tensile | 3900 lbs./in² |
| Mooney Scorch at 135°C. | 5.5 minutes |

The following examples illustrate the preparation of meta dinitrogen heterocycle esters in which the heterocycle contains three carbon atoms in the ring, two of which are also part of a benzene ring.

EXAMPLE 2

To a stirred solution comprising 37.6 grams (0.25 mole) of 2-mercaptobenzimidazole, 40 grams (0.25 mole) of 25 percent sodium hydroxide, and 250 grams of water was added, in one portion, 38 grams (0.25 mole) of diethylthiocarbamyl chloride and the mixture stirred for 4 hours. The precipitate was filtered, washed with water until neutral and air-dried. 2-Benzimidazolyl diethyldithiocarbamate was obtained in 89 percent yield as a cream solid. After recrystallization from ethyl alcohol it melted at 169°–171°C. Analysis gave 15.84 percent nitrogen and 23.95 percent sulfur compared to 15.83 percent nitrogen and 24.16 percent sulfur calculated for $C_{12}H_{15}N_3S_2$.

EXAMPLE 3

To a stirred solution comprising 30 grams (0.2 mole) of 2-mercaptobenzimidazole, 150 ml. of benzene and 30 ml. of triethylamine was added, in one portion, 35.5 grams (0.2 mole) of diisopropylthiocarbamyl chloride. The mixture was stirred for 6 hours, cooled, and the solid collected by filtration. The 2-benzimidazolyl diisopropyldithiocarbamate thus obtained was slurried with hot methanol and the product filtered from solution. The white solid softened at 152°C. and decomposed above 190°C. Analysis gave 14.1 percent nitrogen and 21.22 percent sulfur compared to 14.32 percent nitrogen and 21.85 percent sulfur calculated for $C_{14}H_{19}N_3S_2$.

EXAMPLE 4

Substituting an equimolar amount of morpholinothiocarbonyl chloride for the diisopropylthiocarbamyl chloride in Example 3, 2-benzimidazolyl-4-morpholinocarbodithioate was obtained as a pale yellow powder. After slurrying with methanol and filtering, the residue was a white solid melting at 217°–221°C. Analysis gave 14.92 percent nitrogen and 22.74 percent sulfur compared to 15.05 percent nitrogen and 22.96 percent sulfur calculated for $C_{12}H_{13}N_3OS_2$.

EXAMPLE 5

Substituting an equimolar amount of dibutylthiocarbamyl chloride for the diisopropylthiocarbamyl chloride in Example 3, the product was extracted with ether, the ether layer separated, washed three times with water, and filtered. The filtrate was evaporated to half its volume, slurried in heptane and water, and filtered. 2-Benzimidazolyl dibutyldithiocarbamate was obtained as a white solid melting at 127°–129°C. Analysis gave 13.57 percent nitrogen and 19.84 percent sulfur compared to 13.07 percent nitrogen and 19.95 percent sulfur calculated for $C_{16}H_{23}N_3S_2$.

EXAMPLE 6

A solution was prepared by mixing 30 grams (0.2 mole) of 2-mercaptobenzimidazole, 13.2 grams (0.2 mole) 85 percent potassium hydroxide, 600 ml. of acetone, and 10 ml. of water, heating to 55°C. and, with stirring, maintaining the temperature at 55°–56°C. for 30 minutes. The solution was then cooled to 25°C. and to it was added in one portion, with stirring, 35.6 grams (0.2 mole) of hexamethyleniminothiocarbonyl chloride. The reaction mixture was stirred at 25°–30°C. for 24 hours, then added to 2,000 grams of ice water, and stirred at 0°–10°C. for 30 minutes. The precipitate was collected by filtration, washed with water until neutral, and air-dried at 25°–30°C. 2-Benzimidazolyl hexahydro-1H-azepine-1-carbodithioate was obtained in 80.7 percent yield as a light brown solid. Analysis gave 14.36 percent nitrogen and 22.48 percent sulfur compared to 14.42 percent nitrogen and 22.00 percent sulfur calculated for $C_{14}H_{17}N_3S_2$. It melted at 190°–191°C. after recrystallization from alcohol.

EXAMPLE 7

To a stirred solution comprising 15 grams (0.1 mole) of 2-mercaptobenzimidazole, 6.6 grams (0.1 mole) of 85 percent potassium hydroxide, 300 ml. of acetone, and 10 ml. of water was added, in one portion, 12.4 grams (0.1 mole) of dimethylthiocarbamyl chloride. The mixture was then heated at 50°–60°C. for 5 hours, cooled to 25°C., and added to 1,000 grams of ice water. After stirring for one-half hour, the precipitate was collected by filtration, washed with water until neutral to litmus, and air-dried at room temperature. 2-Benzimidazolyl dimethyldithiocarbamate was obtained in 80 percent yield as a tan solid. After recrystallization from ethyl alcohol it melted at 193°–195°C. Analysis gave 18.04 percent nitrogen compared to 17.71 percent calculated for $C_{10}H_{11}N_3S_2$.

EXAMPLE 8

Substituting an equimolar amount of dipropylthiocarbamyl chloride for the dimethylthiocarbamyl chloride in Example 7, the mixture was heated at 50°–60C. for 5 hours, added to 1,000 grams of ice water, and isolated as in Example 7. 2-Benzimidazolyl dipropyldithiocarbamate was obtained as a yellow solid in 82 percent yield. After recrystallization from ethyl acetate it melted at 125°–126°C. Analysis gave 14.35 percent nitrogen and 21.60 percent sulfur compared to 14.32 percent nitrogen and 21.85 percent sulfur calculated for $C_{14}H_{19}N_3S_2$.

EXAMPLE 9

To a stirred solution comprising 15 grams (0.1 mole) of 2-mercaptobenzimidazole, 6.6 grams (0.1 mole) of 85 percent potassium hydroxide, 150 ml. of acetone, and 5 grams of water was added, in one portion, 20 grams (0.1 mole) of ethylthiocarbaniloyl chloride and the mixture heated at 50°–60°C. for 5 hours. After cooling to 5°C., 400 ml. of water and 50 ml. of ethyl ether were added and stirring continued at 5°–10°C. for 30 minutes. The precipitate was collected by filtration, washed with water until neutral to litmus, and air-dried at 25°–30°C. 2-Benzimidazolyl N-ethyldithiocarbanilate was obtained in 92.5 percent yield as a tan solid. After recrystallization from ethyl alcohol it melted at 191°–193°C. Analysis gave 12.34 percent nitrogen compared to 13.41 percent calculated for $C_{16}H_{15}N_3S_2$.

EXAMPLE 10

To a stirred solution comprising 37.5 grams (0.25 mole) of 2-mercaptobenzimidazole, 16.5 grams (0.25 mole) 85 percent potassium hydroxide, 300 ml. of acetone, and 10 ml. of water was added, in one portion, 43.9 grams (0.25 mole) of methylthiocarbaniloyl chloride and the mixture heated at 50°–60°C. for 5 hours. After cooling to 5°C. 500 ml. of cold water were added and stirring continued at 5°–10°C. for 30 minutes. The precipitate was collected by filtration, washed with water until neutral to litmus, and air-dried at 25°–30°C. 2-Benzimidazolyl N-methyldithiocarbanilate was obtained in 80 percent yield as a tan solid. After recrystallization from ethyl alcohol it melted at 229°–230°C. Analysis gave 13.83 percent nitrogen and 21.41 percent sulfur compared to 14.04 percent nitrogen and 21.42 percent sulfur calculated for $C_{15}H_{13}N_3S_2$.

Employing substantially the same reaction conditions and replacing the methylthiocarbaniloyl chloride with an equimolar amount, respectively, of 1-pyrrolidinylthiocarbonyl chloride and 1-piperidinylthiocarbonyl chloride, further examples were prepared possessing the following physical properties:

EXAMPLE 11

2-Benzimidazolyl 1-pyrrolidinecarbodithioate, a tan solid, M.P. 203°–205°C. after recrystallization from ethyl alcohol, in 80.7 percent yield. Analysis gave 15.88 percent nitrogen and 24.40 percent sulfur compared to 15.96 percent nitrogen and 24.35 percent sulfur calculated for $C_{12}H_{13}N_3S_2$.

EXAMPLE 12

2-Benzimidazolyl 1-piperidinecarbodithioate, a tan solid, M.P. 198°–200°C., after recrystallization from alcohol/chloroform, in 83.5 percent yield. Analysis gave 14.70 percent nitrogen and 22.85 percent sulfur compared to 15.15 percent nitrogen and 23.11 percent sulfur calculated for $C_{13}H_{15}N_3S_2$.

The data in the tables below illustrate useful properties for accelerating vulcanization of rubber. A typical natural rubber tread stock was compounded comprising:

|  | Parts by Weight |
|---|---|
| Smoked sheets rubber | 100 |
| Carbon black | 50 |
| Zinc oxide | 5 |
| Stearic acid | 3 |
| Saturated hydrocarbon softener | 3 |
| Antioxidant | 1.5 |
| Sulfur | 2.5 |

To each of several portions of the base stock was added 0.5 part by weight of accelerator as indicated below:

| Stock | Accelerator |
|---|---|
| AA | 2-Benzimidazolyl N-methyldithiocarbanilate |
| BB | 2-Benzimidazolyl N-ethyldithiocarbanilate |
| CC | 2-Benzimidazolyl 1-pyrrolidine carbodithioate |
| DD | 2-Benzimidazolyl 1-piperidine carbodithioate |

Vulcanization was completed at a temperature of 144°C. The modulus and tensile properties of the 15-minute cures and Mooney scorch are recorded in Table I.

TABLE I

| Stock | Modulus | Tensile | Mooney Scorch |
|---|---|---|---|
| AA | 1420 | 3800 | 10.2 |
| BB | 1430 | 3950 | 8.8 |
| CC | 2000 | 4200 | 8.0 |
| DD | 1800 | 3800 | 8.1 |

In the following test the rubber compositions contained a retarder of vulcanization. A stock was compounded comprising:

|  | Parts by Weight |
|---|---|
| Smoked sheets rubber | 100 |
| Carbon black | 50 |
| Zinc oxide | 5 |
| Stearic acid | 3 |
| Saturated hydrocarbon softener | 3 |
| Antioxidant | 1.5 |
| Sulfur | 2.5 |
| N-Nitrosodiphenylamine | 1 |

To the above there was added in separate stocks 0.5 part of accelerator as follows:

| Stock | Accelerator |
|---|---|
| EE | 2-Benzimidazolyl diethyldithio carbamate |
| FF | 2-Benzimidazolyl diisopropyldithio carbamate |
| GG | 2Benzimidazolyl 4-morpholinodithio carbamate |
| HH | 2-Benzimidazolyl dibutyldithio carbamate |

Vulcanization was completed at a temperature of 144°C. The modulus and tensile properties and Mooney scorch are recorded in Table II.

TABLE II

| Stock | Cure time in minutes | Modulus | Tensile | Mooney Scorch |
|---|---|---|---|---|
| EE | 15 | 1850 | 4100 | |
|    | 30 | 2050 | 3950 | 6.6 |
|    | 45 | 1950 | 3720 | |
|    | 60 | 1860 | 3480 | |
| FF | 15 | 950  | 2380 | |
|    | 30 | 1400 | 3370 | 7.4 |
|    | 45 | 1670 | 3440 | |
|    | 60 | 1670 | 3190 | |
| GG | 15 | 1010 | 2630 | 8.4 |
|    | 30 | 1400 | 3020 | |
|    | 45 | 1540 | 3090 | |
|    | 60 | 1540 | 3130 | |
| HH | 15 | 1900 | 3710 | |
|    | 30 | 2050 | 3700 | 7.5 |
|    | 45 | 1950 | 3520 | |
|    | 60 | 1930 | 3330 | |

Butadiene-styrene copolymer rubber was blended in a standard formula as follows:

| | Parts by Weight |
|---|---|
| SB-R 1500 | 100 |
| Carbon black | 50 |
| Zinc oxide | 4 |
| Stearic acid | 2 |
| Saturated hydrocarbon softener | 10 |
| Antioxidant | 1.5 |
| Sulfur | 1.75 |

To each of several portions of the base stock was added 1.2 parts by weight of accelerator as indicated below:

| Stock | Accelerator |
|---|---|
| JJ | 2-Benzimidazolyl diethyldithio carbamate |
| KK | 2-Benzimidazolyl 1-pyrrolidine carbodithioate |

Vulcanization was completed at a temperature of 144°C. The modulus and tensile properties of the 60-minute cures and Mooney scorch are recorded in Table III.

TABLE III

| Stock | Modulus | Tensile | Mooney Scorch |
|---|---|---|---|
| JJ | 1150 | 3300 | 18.9 |
| KK | 840 | 2700 | 29.8 |

The product of Example 6 was employed as the accelerator in a composition comprising:

| | Parts by Weight |
|---|---|
| Smoked sheets rubber | 100 |
| Carbon black | 50 |
| Zinc oxide | 5 |
| Stearic acid | 3 |
| Saturated hydrocarbon softener | 3 |
| Sulfur | 2.5 |
| 2-Benzimidazolyl hexahydro-1H-azypine-1-carbodithioate | 0.5 |

Vulcanization was completed in 30 minutes at a temperature of 144°C. and the following results were obtained:

| | |
|---|---|
| Modulus | 2350 lbs./in² |
| Tensile | 3300 lbs./in² |
| Mooney scorch at 135°C. | 10.3 minutes |

The accelerator dosage will usually fall within the range of 0.1–5.0 parts accelerator per 100 parts by weight of rubber. As mentioned above the new compounds are useful for accelerating the vulcanization of EPDM rubber, and in this and other rubbers of low unsaturation the accelerator dosage will usually be higher than for natural rubber. Moreover, it may be expedient to use the new compounds in conjunction with a secondary accelerator, as for example 2-mercaptobenzothiazole.

The American Society for Testing Materials (ASTM) defines EPDM in the 1965 Book of ASTM Standards, part 28, page 695, as follows: "EPDM—Terpolymer containing ethylene and propylene in the backbone and a diene in the side chain." Amberg discusses the dienes which have been used with ethylene and propylene in Vulcanization of Elastomers, 324, 325 (Alliger and Sjothum ed. 1963). Amberg states: "Good results have been obtained with compounds which have one internal and one terminal double bond. Dicyclopentadiene is one of the preferred dienes. 2-Methylene-norbornene and 11-ethyl-1,11-tridecadiene are examples of other monomers which react satisfactorily." Cyclooctadiene and 1,4-hexadiene are also used as the diene monomer of EPDM. The addition of 1.5 parts by weight of one of the new accelerators followed curing for 10 minutes at 160°C. has given good results in the following composition:

| | Parts by Weight |
|---|---|
| EPDM | 100 |
| Zinc oxide | 5 |
| Carbon black | 80 |
| Aromatic processing oil | 40 |
| Sulfur | 1.5 |
| 2-Mercaptobenzothiazole | 0.5 |

It is intended to cover all changes and modifications of the examples of the invention herein chosen for purposes of disclosure which do not constitute departures from the spirit and scope of the invention.

What is claimed is:

1. A compound of the formula

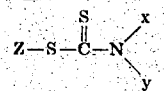

where $x$ and $y$ independently are alkyl of one to five carbon atoms, allyl, methallyl, 2-chloroallyl, 2-bromoallyl, cyclopentyl, cyclohexyl, phenyl, tolyl, naphthyl, benzyl or phenethyl and taken together with the nitrogen are pyrrolidino, piperidino, 2-methyl-5-ethyl piperidino, hexamethylenimino, morpholino, 2,6-dimethylmorpholino, 2,5-dimethylpyrrolidino, heptamethylenimino and octamethylenimino; and Z is 2-benzimidazolyl.

2. A compound of claim 1 wherein $x$ and $y$ are alkyl.

3. A compound of claim 1 wherein $x$ and $y$ are taken together.

4. A compound of claim 1 wherein *x* is alkyl and *y* is phenyl.
5. A compound of claim 1 wherein *x* and *y* are ethyl.
6. A compound of claim 1 wherein
is pyrrolidino.
7. A compound of claim 1 wherein
is morpholino.
8. A compound of claim 1 wherein
is piperidino.
9. A compound of claim 1 wherein
is hexamethylenimino.
* * * * *